(12) United States Patent
Feng et al.

(10) Patent No.: US 8,444,947 B2
(45) Date of Patent: May 21, 2013

(54) METHOD FOR MAKING CARBON NANOTUBE WIRE STRUCTURE

(75) Inventors: Chen Feng, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 16 days.

(21) Appl. No.: 12/650,804

(22) Filed: Dec. 31, 2009

(65) Prior Publication Data

US 2011/0052478 A1 Mar. 3, 2011

(30) Foreign Application Priority Data

Aug. 28, 2009 (CN) .......................... 2009 1 0189915

(51) Int. Cl.
*D01F 9/12* (2006.01)
(52) U.S. Cl.
USPC .......................... 423/447.1; 977/742; 977/762
(58) Field of Classification Search
USPC .......................................... 423/447.1–447.3
See application file for complete search history.

(56) References Cited

U.S. PATENT DOCUMENTS

| | | | |
|---|---|---|---|
| 2007/0138303 A1* | 6/2007 | Asakura et al. | 235/492 |
| 2007/0166223 A1* | 7/2007 | Jiang et al. | 423/447.1 |
| 2008/0170982 A1* | 7/2008 | Zhang et al. | 423/447.3 |
| 2008/0248235 A1 | 10/2008 | Feng et al. | |
| 2009/0153502 A1 | 6/2009 | Jiang et al. | |
| 2009/0167136 A1 | 7/2009 | Liu et al. | |

FOREIGN PATENT DOCUMENTS

| | | |
|---|---|---|
| TW | 200833862 A | 8/2008 |
| TW | 200929636 A | 6/2009 |
| TW | 200935485 A | 7/2009 |

* cited by examiner

*Primary Examiner* — Daniel C McCracken
(74) *Attorney, Agent, or Firm* — Altis Law Group, Inc.

(57) ABSTRACT

The present disclosure provides a method for making a carbon nanotube wire structure. A plurality of carbon nanotube arrays is provided. One carbon nanotube film is formed by drawing a number of carbon nanotubes from each of the plurality of carbon nanotube arrays, whereby a plurality of carbon nanotube films is formed. The carbon nanotube films converge at one spot. The carbon nanotube wire structure is formed by treating the carbon nanotube films by at least one of a mechanical method and an organic solvent method.

19 Claims, 4 Drawing Sheets

US 8,444,947 B2

METHOD FOR MAKING CARBON NANOTUBE WIRE STRUCTURE

RELATED APPLICATIONS

This application claims all benefits accruing under 35 U.S.C. §119 from China Patent Application No. 200910189915.0, filed on Aug. 28, 2009 in the China Intellectual Property Office. The application is also related to copending application entitled, "METHOD FOR MAKING CARBON NANOTUBE WIRE STRUCTURE", filed Nov. 19, 2009, Ser. No. 12/621,512.

BACKGROUND

1. Technical Field

The present disclosure relates to methods for making carbon nanotube wire structure.

2. Discussion of Related Art

Carbon nanotubes can be composed of a plurality of coaxial cylinders of graphite sheets. Carbon nanotubes have received a great deal of interest since the early 1990s. Carbon nanotubes have interesting and potentially useful electrical and mechanical properties. Due to these and other properties, carbon nanotubes have become a significant focus of research and development for use in electron emitting devices, sensors, transistors, and other devices.

Generally, carbon nanotubes prepared by conventional methods are in particle or powder form. The particle or powder-shaped carbon nanotubes limit the applications of the carbon nanotubes. Thus, preparation of macro-scale carbon nanotube structures has attracted attention.

A carbon nanotube wire structure is one macro-scale carbon nanotube structure. The carbon nanotube wire structure includes a number of carbon nanotubes, and qualifies as a novel potential material which can replace carbon nanofibers, graphite nanofibers, and fiberglass. The carbon nanotube wire structure is used in electromagnetic shield cables, printed circuit boards, special defend garments, and so on.

A typical example is shown and discussed in U.S. Publication. No. 20070166223A, entitled, "METHOD FOR MAKING CARBON NANOTUBE YARN," published to Fan et al. on Jul. 19, 2007. This patent discloses a carbon nanotube yarn. The method for making the yarn includes providing a super-aligned carbon nanotube array; drawing a carbon nanotube film from the carbon nanotube array; treating the carbon nanotube film with an organic solvent to form a carbon nanotube yarn.

However, a diameter of the yarn made by the method is restricted by a scale of the carbon nanotube array. The carbon nanotube array is usually grown on a silicon substrate. A large silicon substrate is difficult to produce using the present silicon technology. Therefore, it is difficult to acquire a large area of the carbon nanotube array. Thus, the yarn twisted by the pre-primary assembly has a small diameter and the mechanical strength and toughness of the yarn is inferior, thereby limiting its application.

What is needed, therefore, is a method for making a carbon nanotube wire structure with a large diameter, superior mechanical strength, and superior toughness.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
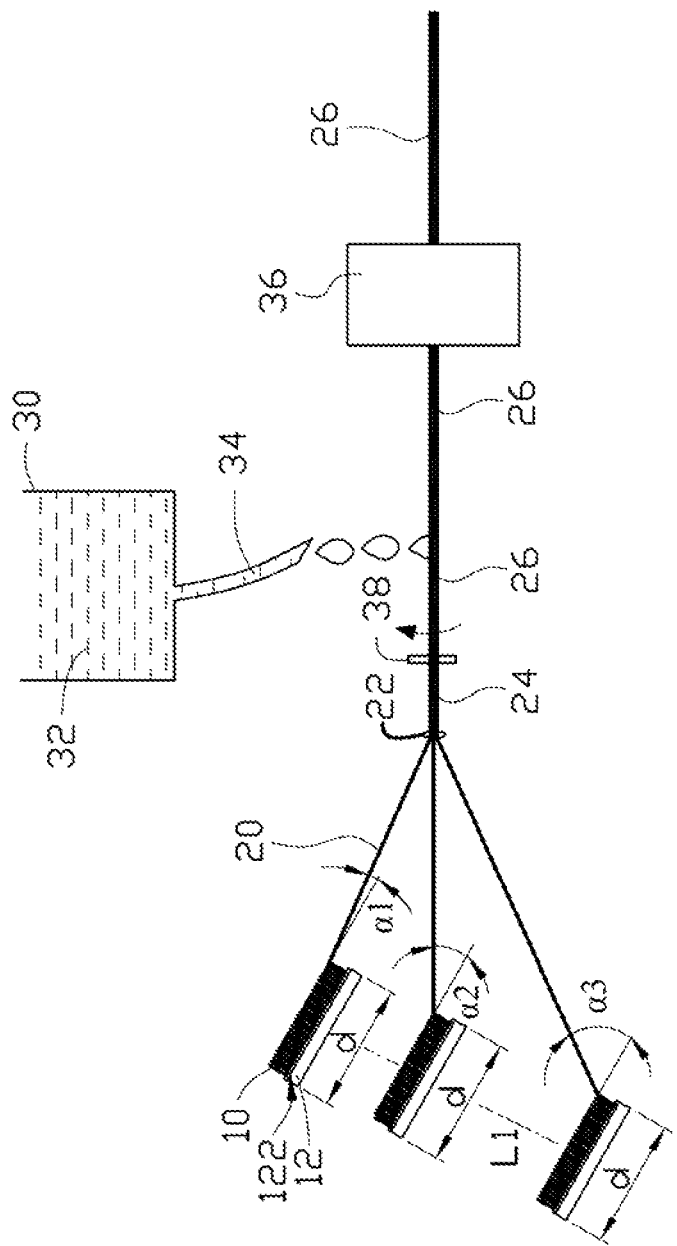
FIG. 1 is a schematic view of one embodiment of a method for making a carbon nanotube wire structure.
Figure 2:
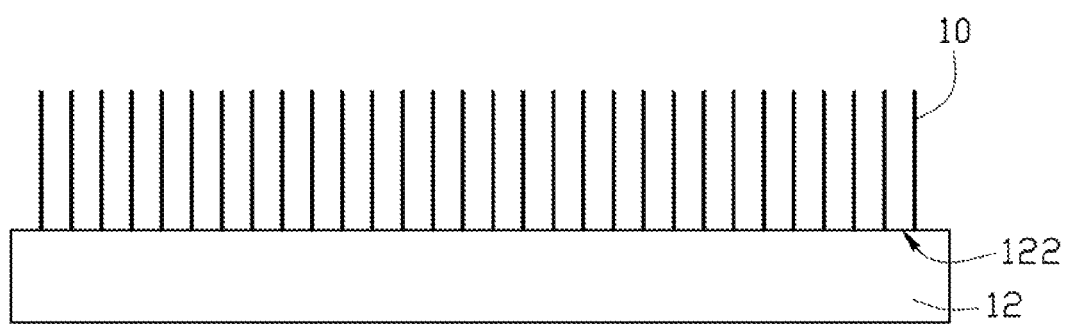
FIG. 2 is a schematic side view of a substrate wherein a carbon nanotube array is grown.

Referring to FIG. 1 and FIG. 2, one embodiment of a method for making a carbon nanotube wire structure is provided. The method includes:

(S1) providing a plurality of carbon nanotube arrays 10, each of the carbon nanotube arrays 10 is formed on a top surface 122 of a substrate 12, and the top surfaces 122 of the plurality of substrates 12 are in different planes;

(S2) forming a plurality of carbon nanotube films, each carbon nanotube film 20 formed by drawing a number of carbon nanotubes from each of the plurality of carbon nanotube arrays 10, wherein an angle between the drawing direction and the surface 122 of each substrate 12 is about 0 degrees to about 50 degrees;

(S3) converging the carbon nanotube films 20 at one spot 22 to form a carbon nanotube wire structure precursor 24; and (S4) treating the carbon nanotube wire structure precursor 24 by at least one of a mechanical method and an organic solvent method to form the carbon nanotube wire structure 26.

Figure 3:
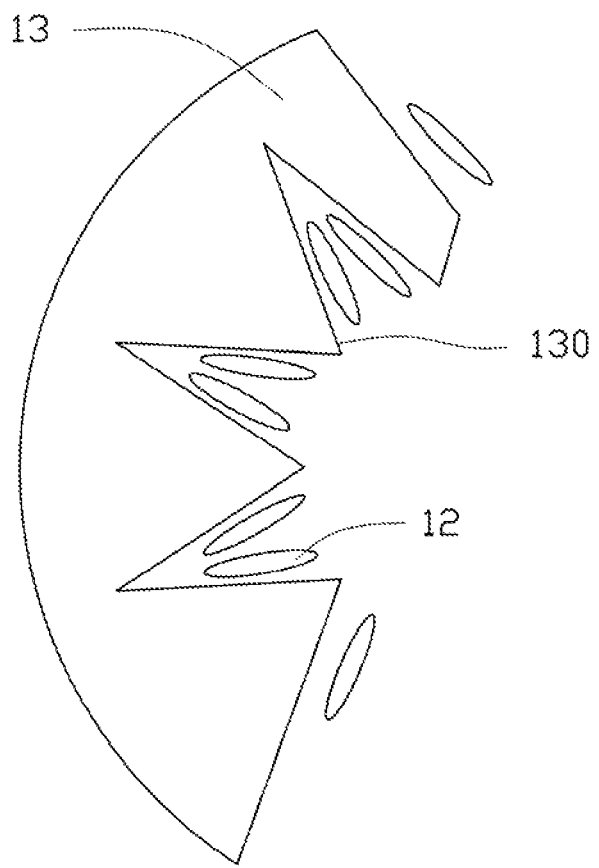
FIG. 3 is a schematic view of a hackle supporter for supporting substrates wherein the carbon nanotubes are grown.

In step (S1), the arrangement of the substrates 12 is not limited to ensure the top surfaces 122 of the substrates 12 are in different planes, e.g. the surfaces 122 of the substrates 12 are not coplanar. The number of the substrates 12 is unrestricted. In one embodiment according to FIG. 1, the number of the substrates 12 is three. The substrates 12 are arranged in the form of a straight line L1, e.g. one substrate 12 is above another substrate 12. The top surface 122 of each surface of the substrate is substantially parallel with each other. In another embodiment, referring to FIG. 3, the number of the substrates is eight, and the substrates 12 are supported by a supporter 13. The supporter 13 has a sector configuration. An inner surface of the supporter 13 is configured to be a zigzag fashion such that the substrates 12 can be arranged in the same manner on the inner surface of the supporter 13. Every two substrates 12 are disposed on two opposite surfaces of the supporter 13.

Referring to FIG. 2, the carbon nanotube array 10 is composed of a plurality of carbon nanotubes. The carbon nanotubes are substantially arranged in a same direction that is perpendicular to the top surface 122 of the substrate 12. The plurality of carbon nanotubes can be single-walled carbon nanotubes with diameters of about 0.5 nanometers to about 50 nanometers, double-walled nanotubes with diameters of about 1 nanometer to about 50 nanometers, multi-walled carbon nanotubes with diameters of about 1.5 nanometers to about 50 nanometers, or any combination thereof. In one embodiment, the plurality of carbon nanotubes is multi-walled carbon nanotubes, and substantially parallel to each other. Each carbon nanotube array 10 is essentially free of impurities, such as carbonaceous or residual catalyst particles. Each carbon nanotube array 10 can be a super aligned carbon nanotube array. A method for making the plurality of carbon nanotube arrays 10 is unrestricted, and can be by chemical vapor deposition methods or other methods.

In step (S2), each carbon nanotube film 20 is formed from one carbon nanotube array 10 formed on the top surface 122 of the substrate 12. A method for making the carbon nanotube film 20 includes the following steps: (S21): providing a drawing tool, contacting a plurality of carbon nanotubes of one carbon nanotube array with the drawing tool; (S22): pulling out the plurality of carbon nanotubes from the carbon nanotube array with the drawing tool along a direction to form the carbon nanotube film 20.

In step (S21), the drawing tool can be a bar or an adhesive tape. When the drawing tool contacts the plurality of carbon nanotubes, the carbon nanotubes will adhered on the drawing tool by Van der Waals attractive force. The plurality of carbon nanotubes can be stretched out from the carbon nanotube array by the drawing tool.

In step (S22), when drawing the carbon nanotubs from the carbon nanotube array 10, an angle $\alpha$ can be formed between the drawing direction and the top surface 122 of the substrate 12, and the angle $0°<\alpha \leqq 50°$, typically the angle $0°<\alpha \leqq 5°$. A length of each of the substrates 12 is d as shown in FIG. 1. And a distance between every two adjacent substrates 12 should be kept larger than d×tan($\alpha$) to avoid the carbon nanotube film 20 drawing from one carbon nanotube array 10 to be affected by another one. In one embodiment of FIG. 1, three angles $\alpha 1$, $\alpha 2$, $\alpha 3$ are formed between each drawing direction and each top surface 122 of each of the three substrates 12. And $\alpha 1 < \alpha 2 < \alpha 3$, $0°<\alpha 1 \leqq 5°$, $5°<\alpha 2 \leqq 10°$, $10°<\alpha 3 \leqq 15°$. During the drawing process, as the plurality of carbon nanotubes contacting the drawing tool are stretched out, other carbon nanotubes are also stretched out end to end due to the van der Waals attractive force between ends of adjacent carbon nanotubes. The carbon nanotubes in the carbon nanotube film 20 are substantially parallel to the drawing direction of the carbon nanotube film 20. In one embodiment, the drawing tool is an adhesive tape with a certain width. The width of the adhesive tap can be a little larger than a contacting surface between the plurality of carbon nanotubes and the drawing tool.

In step (S3), as the plurality of carbon nanotube films 20 is stretched out from the plurality of carbon nanotube arrays 10, each stretched direction can extend from each of the plurality of carbon nanotube arrays 10 to one spot 22. The spot 22 can be an object having a hole, such as a metal ring or means for converging the carbon nanotube films 20 into a carbon nanotube wire structure precursor 24. During the stretching process, each carbon nanotube film 20 gradually converges toward one spot 22. As the carbon nanotube films go through the spot 22, the plurality of carbon nanotube films 20 converges at the spot 22 to form the carbon nanotube wire structure precursor 24. Since each of the carbon nanotube films 20 is adhesive in nature, the carbon nanotube films 20 can adhere to each other to form the carbon nanotube wire structure precursor 24. The carbon nanotube wire structure precursor 24 includes a plurality of carbon nanotube films 20 stacked with each other.

In step (S4), according to one embodiment, the carbon nanotube wire structure precursor 24 is twisted by a mechanical force to form the carbon nanotube wire structure 26. The carbon nanotube wire structure precursor 24 can be fixed at a rotating roller 38. The rotating roller 38 can be rotated clockwise or counterclockwise. More specifically, during rotation, each of the carbon nanotube films 20 is successively drawn from each of the plurality of carbon nanotube arrays 10. The carbon nanotube wire structure precursor 24 is twisted clockwise or counterclockwise into the carbon nanotube wire structure 26 by a mechanical force of the rotating roller 38. A continuous process of making the carbon nanotube wire structure 26 can be conducted.

The carbon nanotube films 20 in the carbon nanotube wire structure 26 after being twisted can adhere to each other without an adhesive because of their inherent adhesive nature. The surface of the carbon nanotube wire structure 26 is adhesive. Thus, it is difficult to discern the individual carbon nanotube film 20 in the carbon nanotube wire structure 26, even when taking a cross section of the carbon nanotube wire structure 26. The carbon nanotube wire structure 26 includes a plurality of successively oriented carbon nanotubes joined end to end by van der Waals attractive force, and the carbon nanotubes are aligned around an axis of the carbon nanotube wire structure 26 like a helix. Length of the carbon nanotube wire structure 26 can be arbitrarily set as desired.

Further, the carbon nanotube wire structure 26 can be treated with a volatile organic solvent 32. An entire surface of the carbon nanotube wire structure 26 can be soaked with the organic solvent 32. The organic solvent 32 can be dropped on the surface of the carbon nanotube wire structure precursor 24 by a dropper 30. In one embodiment, the dropper 30 is positioned upon/above the surface of the carbon nanotube wire structure 24. The dropper 30 includes an opening 34 in a bottom thereof. The organic solvent 32 can be dropped out from the opening 34 of the dropper 30, drop by drop. The organic solvent 32 can be any volatile fluid, such as ethanol, methanol, acetone, dichloroethane, and chloroform. The surface of the carbon nanotube wire structure 26 will have a low friction coefficient after being treated by the organic solvent.

In one embodiment, the organic solvent 32 is ethanol. After being soaked by the organic solvent 32 portion by portion, the carbon nanotube wire structure 26 can be tightly shrunk portion by portion, under a surface tension of the organic solvent. The carbon nanotube wire structure 26 treated by the organic solvent 32 includes a plurality of successively oriented carbon nanotubes joined end to end by van der Waals attractive force, and the carbon nanotubes are aligned around the axis of the carbon nanotube wire structure 26 like a helix. It is difficult to discern the individual carbon nanotube films 20 in the carbon nanotube wire structure 26, even when taking a cross section of the organic solvent treated carbon nanotube wire structure 26. The carbon nanotube films 20 are without obvious seams therebetween.

Furthermore, the carbon nanotube wire structure 26 can be dried after being treated with the organic solvent 32. In the embodiment shown in FIG. 1, the carbon nanotube wire structure 26 is passed through a drying device 36 portion by portion. The temperature of the drying device 36 can be in a range from about 80 degrees centigrade to about 100 degrees centigrade, thus, the organic solvent 32 in the carbon nanotube wire structure 26 can volatilize quickly. The carbon nanotubes in the carbon nanotube wire structure 26 are then arranged more closely. In another embodiment, the carbon nanotube wire structure 26 is dried with a blow dryer.

In step (S4), according to another embodiment, the carbon nanotube wire structure precursor 24 can be treated with the organic solvent 32 directly to form the carbon nanotube wire structure 26. After being soaked by the organic solvent 32 portion by portion, the carbon nanotube wire structure precursor 24 can be tightly shrunk portion by portion to form the carbon nanotube wire 26, under a surface tension of the organic solvent.

A diameter of the carbon nanotube wire structure 26 is related to the number and size of the carbon nanotube arrays 10. The diameter of the carbon nanotube wire structure 26 can be any diameter, such as about 1 micron or more than 50 microns. In one embodiment, the diameter of the carbon nanotube wire structure 26 is about 130 microns.

It is to be understood that the above-mentioned process for making the carbon nanotube wire structure 26 is a successive process.

Figure 4:
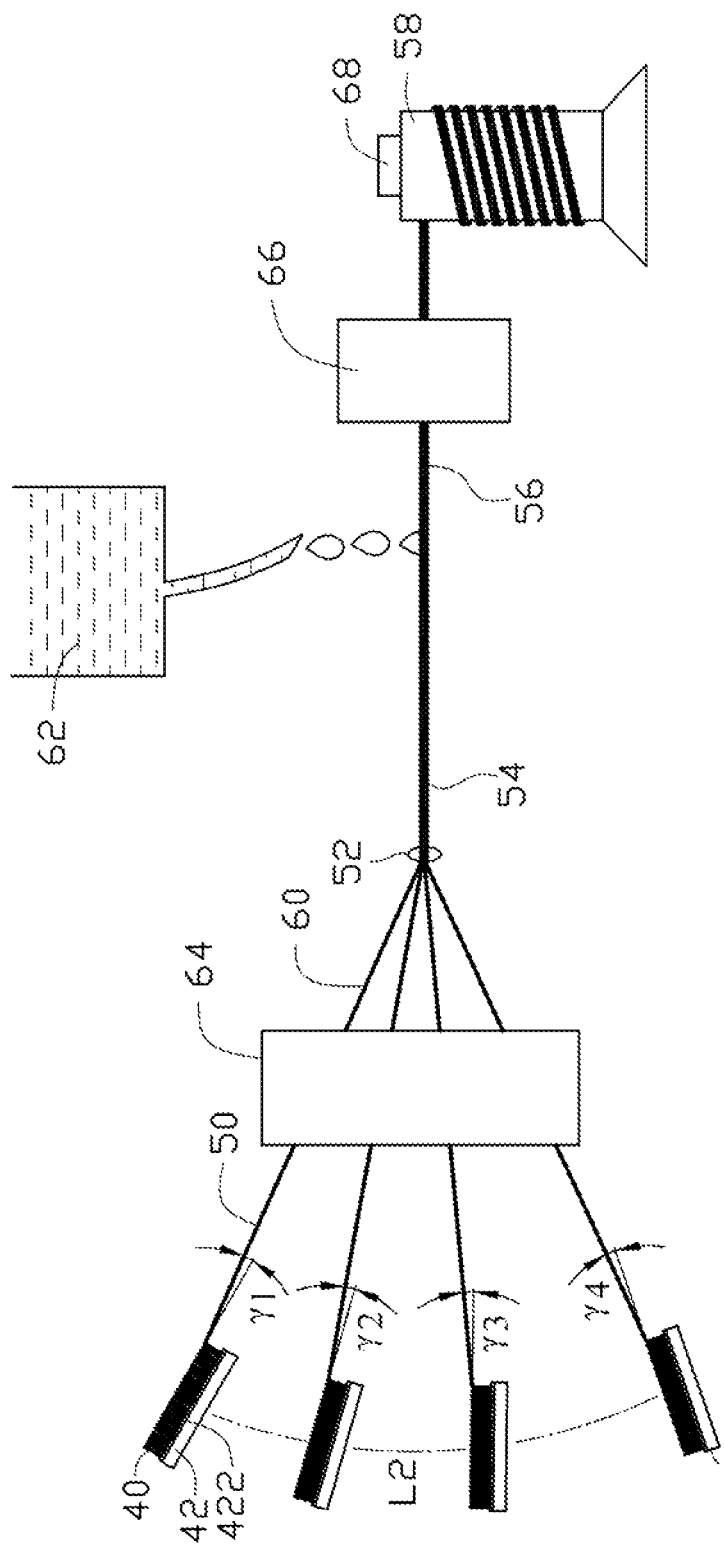
FIG. 4 is a schematic view of another embodiment of a method for making a carbon nanotube wire structure.

Referring to FIG. 4, another embodiment of a method for making a carbon nanotube wire structure 56 is provided. The method includes:

(N1) providing a plurality of carbon nanotube arrays 40, each of the carbon nanotube array 40 is formed on a surface 422 of a substrate 42, and the surfaces 422 of the substrates 42 are in different planes;

(N2) forming a plurality of carbon nanotube films 50, each carbon nanotube film 50 is formed by drawing a number of carbon nanotubes from each of the plurality of carbon nanotube arrays 40, wherein an angle between the drawing direction and the surface 422 of each substrate 40 is about 0 degrees to about 50 degrees;

(N3) applying at least one metal layer on each of the plurality of carbon nanotube films 50 to form a plurality of carbon nanotube composite films 60 via an apparatus 64;

(N4) converging the carbon nanotube composite films 60 at one spot 52 to form a carbon nanotube wire structure precursor 54; and (N5) treating the carbon nanotube wire structure precursor 54 with an organic solvent 62.

The detail process of the step (N1) is similar to the step (S1) discussed above.

In the step (N2), according to one embodiment shown in FIG. 4, four substrates 42 are included. The four substrates 42 are arranged in the form of a curved line L2. The surfaces 422 of the substrates are not in the same plane. Four angles γ1, γ2, γ3, and γ4 between the drawing directions and the surfaces 422 of the substrates 40 are formed. The other details of the step (N2) are similar to the step (S2) discussed above.

Step (N3) can be conducted by physical methods such as physical vapor deposition methods, or chemical methods such as electroplating deposition methods and chemical plating deposition methods. The physical vapor deposition methods include vacuum metallizing deposition methods or ion sputtering deposition methods. A material of the metal layer can be gold, silver, platinum, copper, or an alloy of any combination thereof. A thickness of the metal layer can be in a range from about 1 nanometer to about 20 nanometers. In one embodiment, the apparatus is a vacuum vessel. The carbon nanotube films 50 passes through a vacuum vessel. In the vacuum vessel, a copper layer is formed on each of the carbon nanotube films 50 by a vacuum metallizing deposition method. A platinum layer is formed on the copper layer. Therefore, each carbon nanotube composite film 60 includes one carbon nanotube film 50 with the copper layer and the platinum layer deposited thereon. The copper layer is located between the carbon nanotube film 50 and the platinum layer.

The detail process of the step (N4) is similar to the step S3 discussed above.

In one embodiment, step (N5) is executed by the organic solvent method. The carbon nanotube wire structure precursor 54 can be treated with the organic solvent directly without being treated by the mechanical method. The method for treating the carbon nanotube wire structure precursor 54 using the organic solvent is similar to the method for treating the carbon nanotube wire structure 26 with the organic solvent 32 in the mechanical method. An entire surface of the carbon nanotube wire structure precursor 54 can be soaked with the organic solvent 62. The carbon nanotube wire structure precursor 54 can shrink into the carbon nanotube wire structure 56 without being twisted, due to a surface tension of the organic solvent 62.

The carbon nanotube wire structure 56 can be dried in a drying device 66 after being treated by the organic solvent.

The organic solvent treated carbon nanotube wire structure 56 can be easily collected, due to its low friction coefficient. The carbon nanotube wire structure 56 is coiled onto a bobbin driven 58 by a motor 68, after being dried by the drying device 66.

In another embodiment, the carbon nanotube wire structure 56 can be twisted with a mechanical force.

It is difficult to discern the number of the individual carbon nanotube composite film 60 in the carbon nanotube wire structure 56 from a cross section of the carbon nanotube wire structure 56. There are no obvious interfaces between the carbon nanotube composite films 50. The carbon nanotube wire structure 56 is a carbon nanotube composite wire structure. The carbon nanotube wire structure 56 includes a plurality of successively oriented carbon nanotubes joined end to end by van der Waals attractive force. The carbon nanotubes are substantially parallel to an axis or a length of the carbon nanotube wire structure, and at least one metal layer is formed on the carbon nanotubes. In one embodiment, the copper layer and the platinum layer are formed on the carbon nanotubes of the carbon nanotube wire structure, with the copper layer located between the carbon nanotubes and the platinum layer, and a diameter of the carbon nanotube wire structure 56 is about 200 microns.

The method for making the carbon nanotube wire structure 56 having a desired diameter can be acquired by the present methods according to the size of a single carbon nanotube array. The carbon nanotube wire structure 56 has good thermal and electrical conductivity, excellent toughness, high mechanical strength, and can be readily used in cables, printed circuit boards, cloths, and other macroscopic applications.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method for making a carbon nanotube wire structure, comprising:

providing a plurality of carbon nanotube arrays, each of the plurality of carbon nanotube arrays being formed on each top surface of a plurality of substrates, each of the top surfaces being in a different plane parallel with each other;

drawing a plurality of carbon nanotubes from each of the plurality of carbon nanotube arrays so that a plurality of carbon nanotube films is formed, wherein an angle between the drawing direction and each of the top surfaces is about 0 degrees to about 50 degrees;

passing the plurality of carbon nanotube films through an object having a hole, so that the plurality of carbon nanotube films converge at the hole of the object to form a carbon nanotube wire structure precursor; and treating the carbon nanotube wire structure precursor by at least one of a mechanical method and an organic solvent method to form the carbon nanotube wire structure.

2. The method of claim 1, wherein a method for making the carbon nanotube film comprises the steps of: providing a drawing tool; contacting a plurality of carbon nanotubes of one carbon nanotube array via the drawing tool; and drawing the plurality of carbon nanotubes along a direction to form the carbon nanotube film.

3. The method of claim 1, wherein the angle is about 0 degrees to about 5 degrees.

4. The method of claim 1, wherein the angle between the drawing direction and the top surface of each substrate is $\alpha$, a length of each substrate is L, and a distance between every two adjacent substrates is larger than $L \times \tan(\alpha)$.

5. The method of claim 1, wherein the carbon nanotube wire structure precursor is treated by the mechanical method, the mechanical method comprising twisting the carbon nanotube wire structure precursor by a mechanical force at the spot to form the carbon nanotube wire structure.

6. The method of claim 5, further comprising a step of treating the carbon nanotube wire structure with an organic solvent after the carbon nanotube wire structure precursor is treated by the mechanical method.

7. The method of claim 6, wherein the organic solvent is a volatile solvent.

8. The method of claim 6, wherein the step of treating the carbon nanotube wire structure with the organic solvent comprises the substeps of: providing a dropper having an opening and an organic solvent received in the dropper; releasing the organic solvent from the opening of the dropper on a surface of the carbon nanotube wire structure.

9. The method of claim 1, wherein the carbon nanotube wire structure precursor is treated with the organic solvent method, the organic solvent method comprises the substeps of: providing a dropper having an opening and an organic solvent received in the dropper; releasing the organic solvent from the opening of the dropper on a surface of the carbon nanotube wire structure precursor.

10. The method of claim 9, wherein the carbon nanotube wire structure is further coiled onto a bobbin.

11. The method of claim 9, further comprising a step of twisting the carbon nanotube wire structure with a mechanical force.

12. The method of claim 1, wherein the number of the substrates is three, and three angles $\alpha 1$, $\alpha 2$ and $\alpha 3$ are formed between the drawing direction and each top surface of the three substrates, in which $\alpha 1 < \alpha 2 < \alpha 3$.

13. The method of claim 12, wherein the angle $\alpha 1$ is about 0 degrees to about 5 degrees, the angle $\alpha 2$ is about 5 degrees to about 10 degrees, and the angle $\alpha 3$ is about 10 degrees to about 15 degrees.

14. The method of claim 1, wherein the plurality of substrates is arranged in a form of a straight line, and at least one substrate is above another substrate.

15. The method of claim 14, wherein the number of the substrates is three, and three angles $\alpha 1$, $\alpha 2$ and $\alpha 3$ are respectively formed between the drawing direction and each top surface of the three substrates, in which $\alpha 1 < \alpha 2 < \alpha 3$.

16. A method for making a carbon nanotube wire structure, the method comprising:

providing a plurality of carbon nanotube arrays, each of the plurality of carbon nanotube arrays being formed on each top surface of a plurality of substrates, each of the top surfaces being in a different plane parallel with each other;

drawing a plurality of carbon nanotubes from each of the plurality of carbon nanotube arrays to form a plurality of carbon nanotube films, wherein an angle between the drawing direction and each of the top surfaces is about 0 degrees to about 50 degrees, applying at least one metal layer on each of the plurality of carbon nanotube films to form a plurality of carbon nanotube composite films;

passing the plurality of carbon nanotube films through an object having a hole, so that the plurality of carbon nanotube films converge at the hole of the object to form a carbon nanotube wire structure precursor; and treating the carbon nanotube wire structure precursor by at least one of a mechanical method and an organic solvent method to form the carbon nanotube wire structure.

17. The method of claim 16, wherein the method of forming the at least one metal layer on each of the plurality of carbon nanotube films is physical vapor deposition methods, electroplating deposition methods, or chemical plating deposition methods.

18. The method of claim 16, wherein the step of forming the at least one metal layer on each of the plurality of carbon nanotube films is carried out in a vacuum vessel.

19. A method for making a carbon nanotube wire structure, the method comprising:

providing a plurality of substrates, each of the plurality of substrates having a top surface, the top surface of each of the plurality of substrates being parallel with each other;

forming a plurality of nanotube arrays on the top surface;

drawing a plurality of carbon nanotube films from each of the plurality of carbon nanotube arrays;

drawing the plurality of carbon nanotube films toward a common spot and converging the plurality of carbon nanotube films at the common spot to form a carbon nanotube wire structure precursor, and then dropping a volatile organic solvent on the carbon nanotube wire structure precursor from a dropper above the carbon nanotube wire structure precursor; and twisting the carbon nanotube wire precursor by a mechanical method.

* * * * *